United States Patent
Pramanik et al.

(10) Patent No.: US 12,277,510 B2
(45) Date of Patent: Apr. 15, 2025

(54) SYSTEMS AND METHOD FOR SOLVING QUADRATIC UNCONSTRAINED D-ARY OPTIMIZATION (QUDO) PROBLEMS BY QUANTUM COMPUTING

(71) Applicant: Tata Consultancy Services Limited, Mumbai (IN)

(72) Inventors: Sayantan Pramanik, Bangalore (IN); Mariswamy Girish Chandra, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 1019 days.

(21) Appl. No.: 17/221,468

(22) Filed: Apr. 2, 2021

(65) Prior Publication Data
US 2022/0269961 A1 Aug. 25, 2022

(30) Foreign Application Priority Data
Feb. 19, 2021 (IN) .............................. 202121007143

(51) Int. Cl.
| | |
|---|---|
| *G06N 7/00* | (2023.01) |
| *G06F 17/17* | (2006.01) |
| *G06N 10/00* | (2022.01) |

(52) U.S. Cl.
CPC .............. *G06N 7/00* (2013.01); *G06F 17/17* (2013.01); *G06N 10/00* (2019.01)

(58) Field of Classification Search
CPC .......... G06N 7/00; G06N 10/00; G06N 20/00; G06N 10/60; G06F 17/17; G06F 17/11
See application file for complete search history.

(56) References Cited

U.S. PATENT DOCUMENTS

| | | | |
|---|---|---|---|
| 10,069,573 B2 | 9/2018 | Krovi et al. | |
| 11,574,030 B1 * | 2/2023 | Harrigan | ................ G06N 10/60 |

(Continued)

FOREIGN PATENT DOCUMENTS

WO    WO-2020106955 A1 *   5/2020   ............. G06F 15/16

OTHER PUBLICATIONS

Lloyd, "Quantum Approximate Computation is Computationally Universal," in arXiv preprint arXiv:1812.11075 (2018). (Year: 2018).*

(Continued)

*Primary Examiner* — Ryan C Vaughn
(74) *Attorney, Agent, or Firm* — Finnegan, Henderson, Farabow, Garrett & Dunner, LLP

(57) ABSTRACT

Quantum Information Processing (QIP) with the availability of Noisy Intermediate-Scale Quantum (NISQ) device(s) are available to work on quantum algorithms. Different problems, which are hard to solve by classical computation, but can be sped up (significantly in some cases) are also being populated. However, current approaches solve only two cluster max-cut problems. Mining the two cluster Max-Cut problem within the framework of quantum Ising model, embodiments of the present disclosure solve Quadratic Unconstrained D-ary Optimization (QUDO) problems by quantum computing with the identification of an appropriate Hamiltonian. More specifically, the problem is mapped to an Ising model to obtain a d-ray Quantum Ising Hamiltonian. The d-ray Quantum Ising Hamiltonian is then executed on one or more qudit processors, to obtain one or more resultant quantum states which are measured in a qudit computational basis to obtain at least one solution.

12 Claims, 7 Drawing Sheets

(56) References Cited

U.S. PATENT DOCUMENTS

| | | | |
|---|---|---|---|
| 11,620,534 B2* | 4/2023 | Matsuo | G06N 5/01 |
| | | | 706/46 |
| 2018/0137192 A1 | 5/2018 | Zaribafiyan et al. | |
| 2020/0286595 A1* | 9/2020 | Neukart | G06N 3/08 |
| 2021/0256351 A1* | 8/2021 | Cao | G06N 3/047 |

OTHER PUBLICATIONS

Guerreschi, "Solving Quadratic Unconstrained Binary Optimization with Divide-and-Conquer and Quantum Algorithms," in arXiv preprint arXiv:2101.07813 (2021). (Year: 2021).*

Jünger et al., "Performance of a Quantum Annealer for Ising Ground State Computations on Chimera Graphs," in arXiv preprint arXiv:1904.11965 (2019). (Year: 2019).*

Ushijima-Mwesigwa, Hayato et al., "Graph Partitioning using Quantum Annealing on the D-Wave System", Quantum Physics—Computer Science, Mar. 2017, Arxiv, https://arxiv.org/ftp/arxiv/papers/1705/1705.03082.pdf.

Cruz-Santos, William et al., "A QUBO Formulation of Minimum Multicut Problem Instances in Trees for D-Wave Quantum Annealers", Article, 2019, Scientific Reports, https://www.nature.com/articles/s41598-019-53585-5.pdf.

Otterbach, J. S. et al., "Unsupervised Machine Learning on a Hybrid Quantum Computer", Quantum Physics, Dec. 2017, Arxiv, https://arxiv.org/pdf/1712.05771.pdf.

* cited by examiner

SYSTEMS AND METHOD FOR SOLVING QUADRATIC UNCONSTRAINED D-ARY OPTIMIZATION (QUDO) PROBLEMS BY QUANTUM COMPUTING

PRIORITY CLAIM

This U.S. patent application claims priority under 35 U.S.C. § 119 to: India Application No. 202121007143, filed on Feb. 19, 2021. The entire contents of the aforementioned application are incorporated herein by reference.

TECHNICAL FIELD

The disclosure relates generally to quantum computing, and more particularly to systems and method for solving Quadratic Unconstrained D-ary Optimization (QUDO) problems by quantum computing.

BACKGROUND

Existing quantum processors are constructed of qubits, which are two-level systems and hence inherently place the constraint of being directly applicable to only binary problems, as each qubit after measurement can be either state 0 or 1. They are capable of solving the problems mapped to the Ising Model (or the equivalent Quadratic unconstrained binary optimization (QUBO) formulation), which use 2×2 Pauli matrices to construct the Hamiltonian corresponding to a problem. To solve higher class problems, methods have been devised which use more resources to represent systems with higher number of levels.

SUMMARY

Embodiments of the present disclosure present technological improvements as solutions to one or more of the above-mentioned technical problems recognized by the inventors in conventional systems. For example, in one aspect, there is provided a processor implemented method for solving Quadratic Unconstrained D-ary Optimization (QUDO) problems. The method comprises receiving, via one or more hardware processors, an input graph comprising a plurality of nodes and a plurality of edges, wherein the input graph comprises a d-ary problem to be solved; mapping, via the one or more hardware processors, the d-ary problem to an Ising Model to obtain a d-ary Quantum Ising Hamiltonian, wherein the d-ary Quantum Ising Hamiltonian is indicative of a cost function; executing, via the one or more hardware processors, the d-ary Quantum Ising Hamiltonian indicative of the cost function, on one or more qudit processors, to obtain one or more resultant quantum states, wherein the one or more resultant quantum states correspond to the identified d-ary problem; and measuring, via the one or more hardware processors, the one or more resultant quantum states in a qudit computational basis to obtain at least one solution.

In an embodiment, the at least one solution is obtained for the cost function.

In an embodiment, the d-ary Quantum Ising Hamiltonian is obtained by replacing Pauli X and Z matrices comprising a binary Quantum Ising Hamiltonian by d-dimensional shift and clock matrices, respectively, and corresponding tensor products.

In an embodiment, the Pauli X and Z matrices correspond to an ith node of the input graph.

In an embodiment, the one or more qudit processors comprise one or more annealing qudit processors or one or more gate model qudit processors.

In an embodiment, when the one or more qudit processors are identified as the one or more gate model qudit processors, the steps of executing, the d-ary Quantum Ising Hamiltonian indicative of the cost function, and measuring the one or more resultant quantum states comprise: placing, one or more qudits in the one or more gate model qudit processors in an equal, zero-phase superposition from an initial zero state using a generalized Walsh-Hadamard matrix; operating the one or more qudits by applying a phase oracle in a d-ary Quantum Approximate Optimization Algorithm (QAOA) to obtain an intermediate superposition state of the one or more qudits; applying, on the one or more qudits, a d-ary diffusion operator in the d-ary Quantum Approximate Optimization Algorithm (QAOA) to obtain a resultant output; repeating the steps of operating and applying based on a pre-defined number of iterations to obtain one or more resultant quantum states; and measuring the one or more resultant quantum states in the qudit computational basis to obtain at least one solution.

In another aspect, there is provided a system for solving Quadratic Unconstrained D-ary Optimization (QUDO) problems. The system comprises a memory storing instructions; one or more communication interfaces; and one or more hardware processors coupled to the memory via the one or more communication interfaces, wherein the one or more hardware processors are configured by the instructions to: receive an input graph comprising a plurality of nodes and a plurality of edges, wherein the input graph comprises a d-ary problem to be solved; map the d-ary problem to an Ising Model to obtain a d-ary Quantum Ising Hamiltonian, wherein the d-ary Quantum Ising Hamiltonian is indicative of a cost function; execute the d-ary Quantum Ising Hamiltonian indicative of the cost function, on one or more qudit processors, to obtain one or more resultant quantum states, wherein the one or more resultant quantum states correspond to the identified d-ary problem; and measure the one or more resultant quantum states in a qudit computational basis to obtain at least one solution.

In an embodiment, the at least one solution is obtained for the cost function.

In an embodiment, the d-ary Quantum Ising Hamiltonian is obtained by replacing Pauli X and Z matrices comprising a binary Quantum Ising Hamiltonian by d-dimensional shift and clock matrices, respectively, and corresponding tensor products.

In an embodiment, the Pauli X and Z matrices correspond to an ith node of the input graph.

In an embodiment, the one or more qudit processors comprise one or more annealing qudit processors or one or more gate model qudit processors.

In an embodiment, when the one or more qudit processors are identified as the one or more gate model qudit processors, are configured by the instructions to execute, the d-ary Quantum Ising Hamiltonian indicative of the cost function, and measure the one or more resultant quantum states by: placing, one or more qudits in the one or more gate model qudit processors in an equal, zero-phase superposition from an initial zero state using a generalized Walsh-Hadamard matrix; operating the one or more qudits by applying a phase oracle in a d-ary Quantum Approximate Optimization Algorithm (QAOA) to obtain an intermediate superposition state of the one or more qudits; applying, on the one or more qudits, a d-ary diffusion operator in the d-ary Quantum Approximate Optimization Algorithm (QAOA) to obtain a resultant output; repeating the steps of operating and applying based on a pre-defined number of iterations to obtain one or more resultant quantum states; and measuring the one or more resultant quantum states in the qudit computational basis to obtain at least one solution.

In yet another aspect, there are provided one or more non-transitory machine-readable information storage media comprising one or more instructions which when executed by one or more hardware processors cause solving of Quadratic Unconstrained D-ary Optimization (QUDO) problems by: receiving an input graph comprising a plurality of nodes and a plurality of edges, wherein the input graph comprises a d-ary problem to be solved; mapping the d-ary problem to an Ising Model to obtain a d-ary Quantum Ising Hamiltonian, wherein the d-ary Quantum Ising Hamiltonian is indicative of a cost function; executing the d-ary Quantum Ising Hamiltonian indicative of the cost function, on one or more qudit processors, to obtain one or more resultant quantum states, wherein the one or more resultant quantum states correspond to the identified d-ary problem; and measuring the one or more resultant quantum states in a qudit computational basis to obtain at least one solution.

In an embodiment, the at least one solution is obtained for the cost function.

In an embodiment, the d-ary Quantum Ising Hamiltonian is obtained by replacing Pauli X and Z matrices comprising a binary Quantum Ising Hamiltonian by d-dimensional shift and clock matrices, respectively, and corresponding tensor products.

In an embodiment, the Pauli X and Z matrices correspond to an ith node of the input graph.

In an embodiment, the one or more qudit processors comprise one or more annealing qudit processors or one or more gate model qudit processors. In an embodiment, when the one or more qudit processors are identified as the one or more gate model qudit processors, the steps of executing, the d-ary Quantum Ising Hamiltonian indicative of the cost function, and measuring the one or more resultant quantum states comprise: placing, one or more qudits in the one or more gate model qudit processors in an equal, zero-phase superposition from an initial zero state using a generalized Walsh-Hadamard matrix; operating the one or more qudits by applying a phase oracle in a d-ary Quantum Approximate Optimization Algorithm (QAOA) to obtain an intermediate superposition state of the one or more qudits; applying, on the one or more qudits, a d-ary diffusion operator in the d-ary Quantum Approximate Optimization Algorithm (QAOA) to obtain a resultant output; repeating the steps of operating and applying based on a pre-defined number of iterations to obtain one or more resultant quantum states; and measuring the one or more resultant quantum states in the qudit computational basis to obtain at least one solution.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
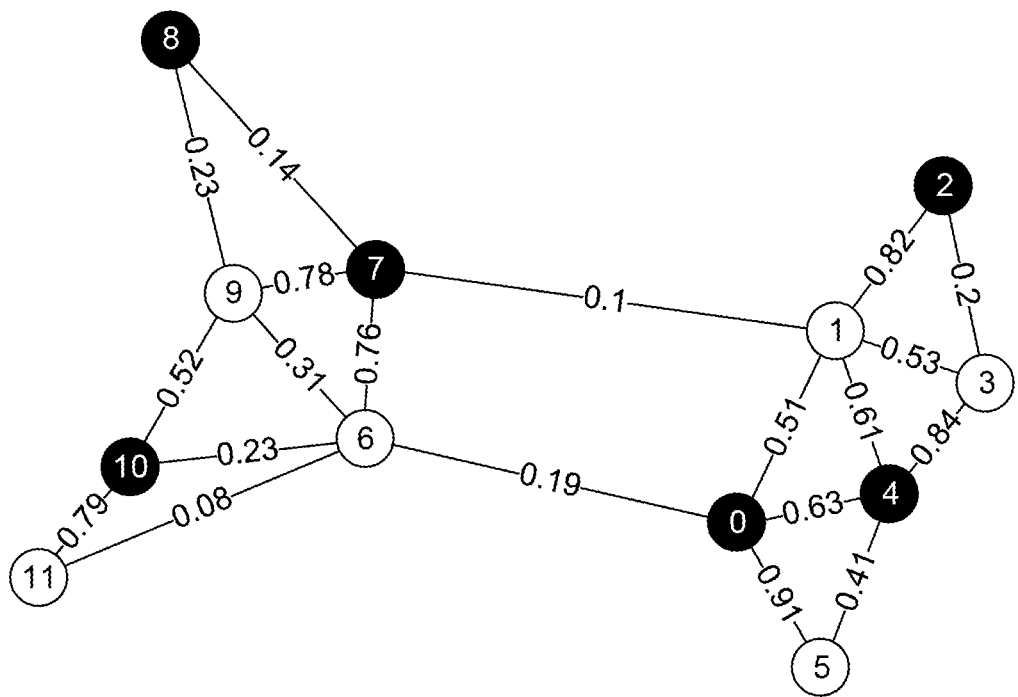
FIG. 1 depicts a result of max-cut clustering on weighted graphs, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Technology is progressing through an exciting period in Quantum Technologies and with the small-scale commercial quantum computers becoming increasingly available, Quantum Information Processing witnesses few developments. Before quantum processors become scalable devices capable of error correction and universality, the current and near-term devices, referred to as the Noisy Intermediate-Scale Quantum (NISQ) devices are explored for solving certain hard problems to achieve significant speedups over the best-known classical algorithms. Promising results are already reported for solutions in the areas of optimization, chemistry, and machine learning, among others. Needless to say, hybrid quantum algorithms which use both classical and quantum resources to solve potentially difficult problems are worked out and put into action.

Considering unsupervised machine learning, and the associated optimization strategy can be elegantly handled by quantum or hybrid quantum algorithms. In the present disclosure, systems and methods associated herein, consider clustering, an important unsupervised task. Clustering consists of assigning labels to elements of a dataset based only on how similar they are to each other—like objects tend to have the same label, unlike objects having different labels. To represent dissimilarity (or similarity), a distance measure needs to be defined between two data samples. The distance between every possible pair of data samples can be captured in a matrix. This matrix can be interpreted as an adjacency matrix of a graph, where each vertex or node represents an element of data set and the weight of edge between vertices is the corresponding distance. In clustering, the main assumption is that distant points belong to different clusters; hence maximizing the overall sum of all weights (distances) between nodes with different labels represents a natural clustering algorithm for two-cluster case. The mathematical formulation of this is a well-known Maximum-Cut (Max-cut) problem and it can be easily translated to an optimization objective. The Max-cut problem is an example of the class of NP-complete problems (e.g., non-deterministic polynomial time-complete problem (NP-complete problem) as known in the art), which are notoriously hard to solve. The Max-Cut and many other combinatorial problems, like, machine scheduling, computer-aided design, and traffic message management, fall under the unifying model of Quadratic Unconstrained Binary Optimization (QUBO). One approach to solving Max-cut is to construct a physical system-typically a set of interacting spin—particles (two state particles) whose lowest energy state encodes the solution to the problem, so that solving the problem is equivalent to finding the ground state of the system.

Two main approaches have been identified to find the ground state of interacting spin systems (quantum optimization) in NISQs: Quantum Annealing (QA) and Quantum Approximate Optimization Algorithms (QAOA). QA is a form of analog computation that has been developed theoretically in the early nineties but realized experimentally in a programmable device only in 2011 by D-Wave Systems™. QAOA, first proposed/developed in 2014 and recently generalized for constrained combinatorial optimization, requires digital gate model quantum computing; it can be seen in some parameter range as a "digitized" version of QA.

In the present disclosure, embodiments herein implement systems and methods for solving Quadratic Unconstrained D-ary Optimization (QUDO) problems by quantum computing by taking a graph as a starting point and clustering is examined/assessed on this abstraction (the graph itself can be constructed from the data points as cursorily mentioned in the beginning). To better understand the embodiments described herein, the present disclosure briefly attempts an explanation on the 2-cluster max-cut problem in terms of the usual Ising model of interacting spins. Then, the strategy has been extended to address 3-cluster problem on graphs. The requisite 3-state particles interaction and the associated Hamiltonian are brought out. Apart from providing typical results, remarks on how to go about implementations are also made, including on the hypothetical qutrit computing device. Extrapolation to more than three cluster case cases involving qudits is also suggested, culminating in the Quadratic Unconstrained D-ary Optimization (QUDO).

Two-Group Clustering Max-Cut Problem:

As mentioned earlier, one way to solve the two-cluster graph maxcut problem is to have a model of two-state interacting particles and solve for the lowest energy state. This interaction model (for spins) is the Ising model, originally developed to describe ferromagnetism, but subsequently extended to more problems.

Ising Model:

The Ising model can be formulated on any graph as follows: consider an undirected graph G=(V, E), where $V=\{v_1, \ldots, v_N\}$ is a set of N sites, and E is a set of edges representing the interactions between these sites. Every site i has a corresponding spin variable $s_i$. These spins are binary-valued, taking values +1 for "up" or −1 for "down". Two spins $s_i$ and $s_j$ may interact with each other. The energy of such an interaction depends on whether the values of the participating spins are the same or different: it is given by $J_{ij}s_is_j$, where $J_{ij}$ is the strength of the interaction.

For each pair of interacting spins $s_i$ and $s_j$ (i.e., $J_{ij} \neq 0$), there exists a corresponding edge (i, j)∈E. The state of the model, s, is an assignment of all N variables $s_i$, 1≤i≤N. The set of all possible configurations is $\xi=\{-1,1\}^N$. As well as pair-wise interactions, there can also be an external field that affects each site i with energy $h_is_i$. Thus, in the general case, the energy of a configuration s∈ξ is given by the so-called Edwards-Anderson Hamiltonian:

$$H(s) = \Sigma_{(i,j) \in E} J_{ij} s_i s_j + \Sigma_{i \in V} h_i s_i \qquad (1)$$

When $h_i=0 \forall i \in V$, the system is said to have no external field (also called zero magnetic field condition), in which case the energy of the configuration s becomes:

$$H(s) = \Sigma_{(i,j) \in E} J_{ij} s_i s_j \qquad (2)$$

In the present disclosure, systems and methods described herein mostly consider the Hamiltonian with zero external field. The system prefers lower energy states, i.e., those s that minimize H(s). An important task is to find configurations that minimise the energy of the system; such a configuration is known as a ground state.

To obtain the Quantum Mechanical description of the Ising model of Equation (1) and Equation (2), each $s_i$ has to be replaced by the Pauli-Z matrix given by $\sigma_z^i$. As the state corresponding to the quantum mechanical interaction of one or more particles is given by the tensor products of the corresponding individual states, the $\sigma_z^i$ and $\sigma_z^j$ terms in H(σ) denote the tensor product between $\sigma_z^i$ and $\sigma_z^j$, where σ is the cumulative spin configuration of the complete system. It must be noted that these terms need to be appropriately constructed through tensor products of $\sigma_z$ and I matrices, as discussed in further description, to capture the pair-wise interaction between the ith and jth spins. With these considerations in mind, the Equation (1) and Equation (2) convert to:

$$H(\sigma) = \Sigma_{ij} J_{ij} \sigma_z^i \sigma_z^j + \Sigma_i h_i \sigma_z^i \qquad (3)$$

$$H(\sigma) = \Sigma_{ij} J_{ij} \sigma_z^i \sigma_z^j \qquad (4)$$

Max-Cut Problem Using Ising Model:

Slightly more formally, the max-cut problem starts with an undirected graph G(V, E) with a set of vertices V and a set of edges E between the vertices. The weight $w_{ij}$ of an edge between vertices i and j is a positive real number, with $w_{ij}=0$ if there is no edge between them. A cut is a set of edges that separates the vertices V into two disjoint sets $V_1$ and $V_2$, such that $V_1 \subseteq V$ and $V_2 = V \setminus V_1$, and the cost of a cut is defined as the sum of all weights of edges connecting vertices in $V_1$ with vertices in $V_2$. The cut can be connected to the Ising model by identifying the vertices with $s_i$s and $w_{ij}$s with $J_{ij}$s; $s_i=1$ suggests that the node i belongs to $V_1$ and $s_i=-1$ corresponds to $V_2$ (of course, $V_1$ and $V_2$ can be interchanged). The cost of the cut can be written in terms of an objective function as mentioned below:

$$C = \sum_{ij} \frac{w_{ij}}{2}(1 - s_i s_j) \quad (5)$$

The max-cut problem aims at partitioning the nodes in such a way that the cost of the resulting cut is maximized. On comparing equation (2) and equation (5), it must be noted that the sign of the $s_i s_j$ term changes. Thus, the max-cut then boils down to fining the lowest energy state, instead of the maximum, of Ising model with $J_{ij} = w_{ij}$:

$$\max C = \max H(s) \quad (6)$$

by noting that scaling the cost function by a constant multiplicative factor does not change the optimal solutions. As remarked earlier, the Max-Cut problem is equivalent to the QUBO formulation where the two-state variable is 0 or 1 binary valued instead of 1 and −1; if the QUBO variables are denoted by $x_i$, the two formulations are related by $s_i = 2x_i - 1$.

The classical Ising max-cut can be extended to the quantum framework by replacing $s_i$ by $\sigma_z^i$, as discussed above. This gives the final quantum Ising Hamiltonian, given by equation (7), which needs to be minimized to get the optimum cut. In carrying out the optimization based on equation (7) below, if two adjacent nodes fall into the same cluster, then $w_{ij}$ is added to the cost function, else it is subtracted.

$$H(\sigma) = \Sigma_{ij} w_{ij} \sigma_z^i \sigma_z^j \quad (7)$$

As discussed in the above description, the $\sigma_z^i \sigma_z^j$ terms represent interaction of the nodes through the use of tensor products, as shown in the following example. Consider a graph having 5 vertices. If there is an edge between the nodes $v_1$ and $v_3$ having weight $w_{13}$, then the interaction between the respective vertices is given by:

$$H_{13} = w_{13}(I \otimes \sigma_z \otimes I \otimes \sigma_z \otimes I \otimes I) \quad (8)$$

The Hamiltonian thus formed is always diagonal, as there are no $\sigma_z$ terms involved, owing to the tensor product between diagonal matrices. It is to be noted that Ising models can be of transverse field type, where, $\sigma_x$ terms corresponding to Pauli-X matrix also are present, in which case the corresponding Hamiltonian would be non-diagonal.

The cost Hamiltonian $H(\sigma)$ of the graph G, being diagonal, has orthogonal eigenvectors that form a complete standard basis. The system settles to the state having the lowest energy and the eigenvector corresponding to it is given by a unit vector along a standard basis state. The least-energy eigenvector is a $2^N \times 1$ vector, whose kth representation gives us an N-length bit-string. The nodes of the graph G, are labelled as 0 or 1, according to the digits in the bit-string, with the most significant bit representing the label of the first vertex. This gives a binary-clustered graph. The result of partitioning a graph with the given algorithm has been shown in FIG. 1. FIG. 1 depicts result of max-cut clustering on weighted graphs, in accordance with an embodiment of the present disclosure. The black shaded circles and the white circles of each node denotes the cluster it belongs to. The minimum energy state corresponding to the partition is given by $|010101100101\rangle$.

Referring now to the drawings, and more particularly to FIGS. 1 through 12, where similar reference characters denote corresponding features consistently throughout the figures, there are shown preferred embodiments and these embodiments are described in the context of the following exemplary system and/or method.

Figure 2:
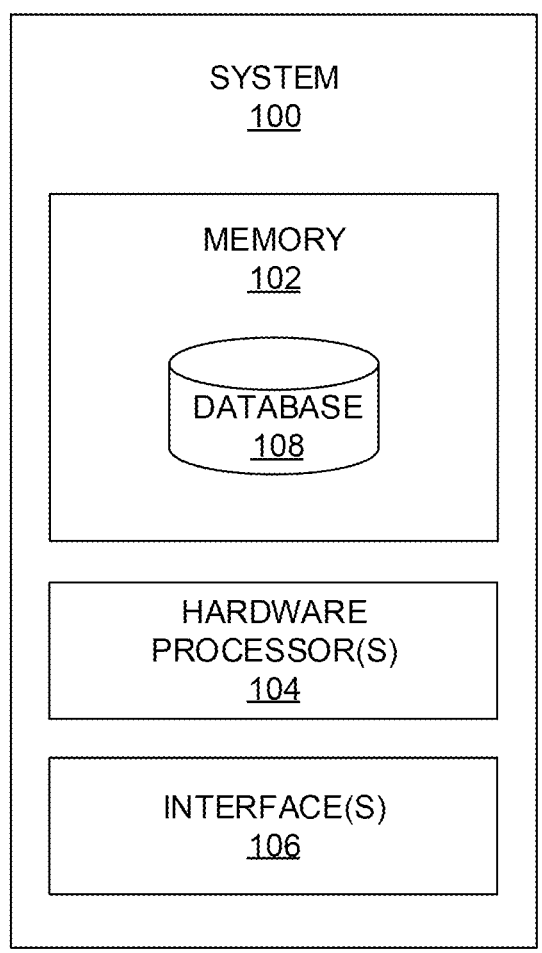
FIG. 2 depicts an exemplary system for solving Quadratic Unconstrained D-ary Optimization (QUDO) problems by quantum computing, in accordance with an embodiment of the present disclosure.

FIG. 2 depicts an exemplary system 100 for solving Quadratic Unconstrained D-ary Optimization (QUDO) problems by quantum computing, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is in the memory 102, wherein the database 108 comprises details on d-ary problems to be solved, and how are they solved. The database 108 further comprises one or more datasets based on which an input graph is derived which includes a d-ary problem to be solved (e.g., max 3-cut or max d-cut/max k-cut as described herein).

The information stored in the database 108 further comprises various algorithms which when executed perform one or more methodologies described herein by the present disclosure. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 3:
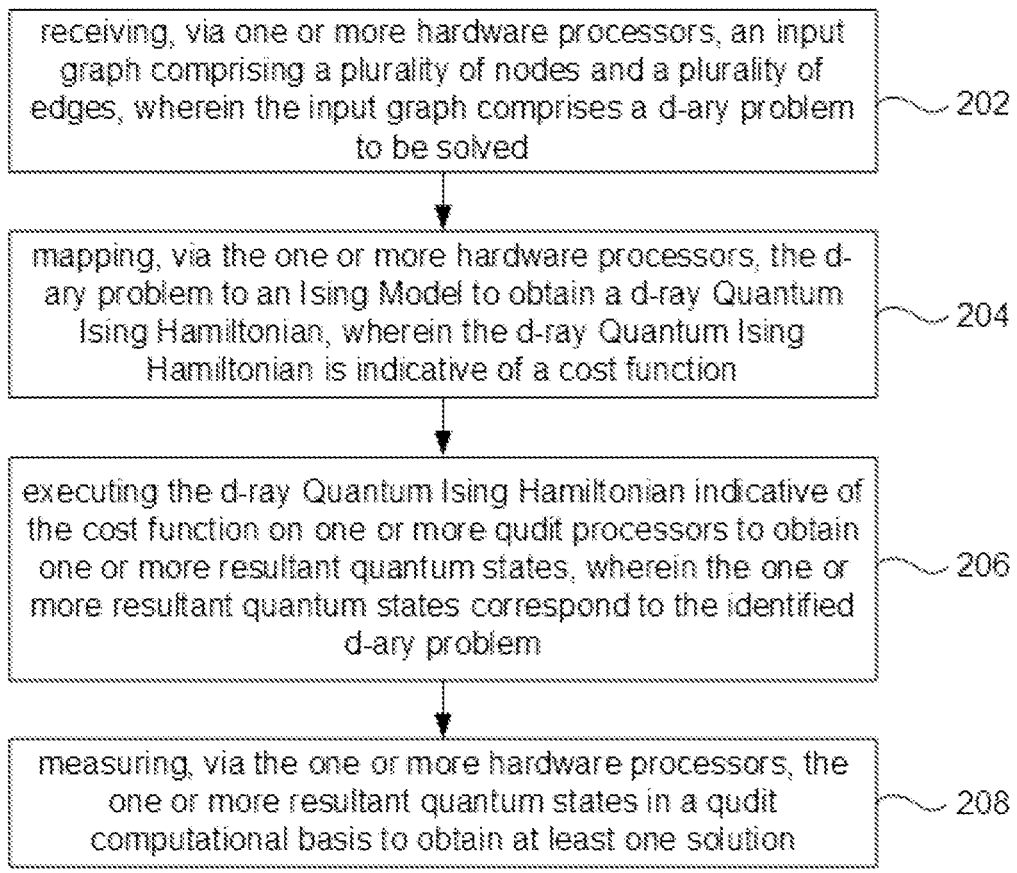
FIG. 3 depicts an exemplary flow chart illustrating a method for solving Quadratic Unconstrained D-ary Optimization (QUDO) problems by quantum computing, using the system of FIG. 1, in accordance with an embodiment of the present disclosure.

FIG. 3, with reference to FIGS. 1-2, depicts an exemplary flow chart illustrating a method for solving Quadratic Unconstrained D-ary Optimization (QUDO) problems by quantum computing, using the system 100 of FIG. 2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. Prior to describing the steps of the method of the present disclosure as depicted in FIG. 3, it is imperative to understand the solving of Max 3-cut using the Ising Model which is being addressed by the present disclosure. Solving of Max 3-cut using the Ising Model is better understood by following description:

Solving Max 3-Cut Using Ising Model:

To arrive at the quantum-assisted solution for Max 3-cut problem, observations are put in place. Max-cut is a combinatorial optimization problem that is classically considered to be hard. It involves partitioning nodes of a graph into two clusters such that the solution has the minimum cost associated with it. The two clusters formed can be denoted by 0 and 1, and the nodes of the graph are placed in either of them. If a node is placed in the cluster 0, then it is said to have a configuration 0. Similarly, if the graph has two vertices, and the first vertex is placed in cluster 0 and the other vertex in cluster 1, then the overall configuration of the graph is 01.

Figure 4:
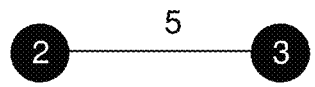
FIG. 4 depicts two nodes connected by an edge, in accordance with an embodiment of the present disclosure.

The cost of a configuration depends on the state of the nodes and the weights of the edges between them. If two adjacent nodes have the same state, then the weight of the edge between them is added to the cost. Conversely, if they have opposite states, then the negative of the weight is added to the cost. Consider the nodes 2 and 3 of a graph with 5 nodes, as shown in FIG. 4 for binary clustering. More specifically, FIG. 4, with reference to FIGS. 1 through 3, depicts two nodes connected by an edge, in accordance with an embodiment of the present disclosure.

The cost for the connection, in the Ising model, is given by:

$$H_{23} = 5 \times \left( I \otimes I \otimes \begin{bmatrix} 1 & 0 \\ 0 & -1 \end{bmatrix} \otimes \begin{bmatrix} 1 & 0 \\ 0 & -1 \end{bmatrix} \otimes I \otimes I \right) \quad (9)$$

which can be simplified as $$H_{23} = 5 \times \left( I \otimes I \otimes \begin{bmatrix} 1 & 0 & 0 & 0 \\ 0 & -1 & 0 & 0 \\ 0 & 0 & -1 & 0 \\ 0 & 0 & 0 & 1 \end{bmatrix} \otimes I \otimes I \right) \quad (10)$$

The 4×4 matrix, in the equation above, incorporates all the possible cluster combinations of the nodes 2 and 3, which are represented along the diagonal of the matrix. If the two clusters are named 0 and 1, then their combinations and energies are shown in the below matrix.

$$\begin{array}{c c} & \begin{matrix} |00\rangle & |01\rangle & |10\rangle & |11\rangle \end{matrix} \\ \begin{matrix} |00\rangle \\ |01\rangle \\ |10\rangle \\ |11\rangle \end{matrix} & \begin{bmatrix} 1 & 0 & 0 & 0 \\ 0 & -1 & 0 & 0 \\ 0 & 0 & -1 & 0 \\ 0 & 0 & 0 & 1 \end{bmatrix} \end{array}$$

More specifically, the above matrix depicts node-node interactions and corresponding interaction energies. The energy is 1 when both the nodes are classified into the same cluster, $|00\rangle$ or $|11\rangle$, and is $-1$ otherwise. The system settles for the lower energy state, $-1$, thus providing the optimum clustering. The idea can be extended to clustering the nodes of a graph into 3 classes, with class labels 0, 1 and 2. The interaction matrix between adjacent nodes of the graph should ideally look like (coupling strength has been considered to be unity) the below matrix.

$$\begin{array}{c c} & \begin{matrix} |00\rangle & |00\rangle & |01\rangle & |02\rangle & |10\rangle & |11\rangle & |12\rangle & |20\rangle & |21\rangle & |22\rangle \end{matrix} \\ \begin{matrix} |01\rangle \\ |02\rangle \\ |10\rangle \\ |11\rangle \\ |12\rangle \\ |20\rangle \\ |21\rangle \\ |22\rangle \end{matrix} & \begin{bmatrix} 1 & 0 & 0 & 0 & 0 & 0 & 0 & 0 & 0 \\ 0 & -1 & 0 & 0 & 0 & 0 & 0 & 0 & 0 \\ 0 & 0 & -1 & 0 & 0 & 0 & 0 & 0 & 0 \\ 0 & 0 & 0 & -1 & 0 & 0 & 0 & 0 & 0 \\ 0 & 0 & 0 & 0 & -1 & 0 & 0 & 0 & 0 \\ 0 & 0 & 0 & 0 & 0 & -1 & 0 & 0 & 0 \\ 0 & 0 & 0 & 0 & 0 & 0 & -1 & 0 & 0 \\ 0 & 0 & 0 & 0 & 0 & 0 & 0 & -1 & 0 \\ 0 & 0 & 0 & 0 & 0 & 0 & 0 & 0 & -1 \end{bmatrix} \end{array}$$

More specifically, the above matrix depicts node-node interaction energies for the ternary clustering case.

In the binary case, the nodes were represented by 2×2 Pauli-Z matrices, the tensor product of which gave the required Hamiltonian matrix. Thus, for the 3-class problem, 3×3 matrices is are needed for each node, whose tensor product with another such matrix can give the requisite 9×9 Hamiltonian.

It can be worked out using a matrix with the cube roots of unity placed along the diagonal of the 3×3 matrix:

$$\Omega_3 = \begin{bmatrix} 1 & 0 & 0 \\ 0 & e^{2\pi i/3} & 0 \\ 0 & 0 & e^{4\pi i/3} \end{bmatrix} \quad (11)$$

In an interaction between two nodes, the first node is represented by $\Omega_3$ and the second node is represented by the complex conjugate transpose of $\Omega_3$, $\Omega_3^\dagger$. The 3 in subscript signifies that the cube roots of unity are used to form the matrix. Thus, the energy of interaction of nodes 2 and 3 is:

$$H_{23} = \ldots \otimes \begin{bmatrix} 1 & 0 & 0 \\ 0 & e^{2\pi i/3} & 0 \\ 0 & 0 & e^{4\pi i/3} \end{bmatrix} \otimes \begin{bmatrix} 1 & 0 & 0 \\ 0 & e^{2\pi i/3} & 0 \\ 0 & 0 & e^{4\pi i/3} \end{bmatrix} \otimes \ldots \quad (12)$$

$$\Rightarrow H_{23} = \ldots \otimes \begin{bmatrix} 1 & 0 & \ldots & 0 & 0 \\ 0 & e^{-2\pi i/3} & \ldots & 0 & 0 \\ \vdots & \vdots & \ddots & \vdots & \vdots \\ 0 & 0 & \ldots & e^{2\pi i/3} & 0 \\ 0 & 0 & \ldots & 0 & 1 \end{bmatrix} \otimes \quad (13)$$

But, the Hamiltonian, being an observable, must be Hermitian. This can be taken care of by modeling the interaction between two nodes as the tensor product between the $\Omega_3$ and $\Omega_3^\dagger$ and taking only the real part of the elements of the resultant matrix. The final form of the interaction is given as:

$$H_{23} = 5 \times I \otimes I \otimes \frac{1}{2} [\Omega_3^2 \otimes \Omega_3^{3\dagger} + \Omega_3^{2\dagger} \otimes \Omega_3^3] \otimes I \otimes I \quad (14)$$

It is interesting to note that this is completely analogous to the k=2 case, where the Pauli-Z matrix is Hermitian and thus, $\sigma_z \otimes \sigma_z^\dagger = \sigma_z^\dagger \otimes \sigma_z$. The term $H_{23} = \frac{1}{2}[\Omega_3^2 \otimes \Omega_3^{3\dagger} + \Omega_3^{2\dagger} \otimes \Omega_3^3]$ evaluates to:

$$\bar{H}_{23} = \begin{bmatrix} 1 & 0 & \ldots & 0 & 0 \\ 0 & -0.5 & \ldots & 0 & 0 \\ \vdots & \vdots & \ddots & \vdots & \vdots \\ 0 & 0 & \ldots & -0.5 & 0 \\ 0 & 0 & \ldots & 0 & 1 \end{bmatrix} \quad (15)$$

Figure 5:
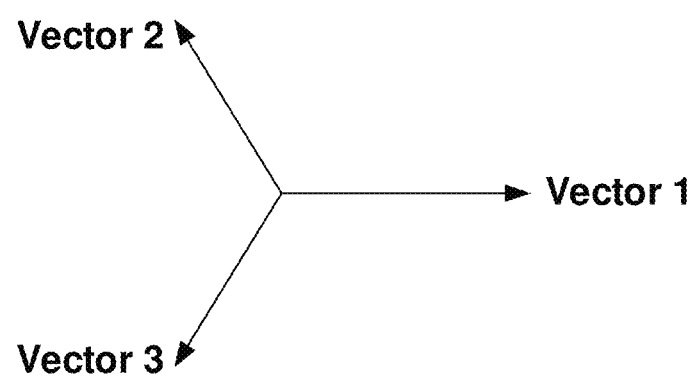
FIG. 5 depicts cluster classes being modelled along vectors, 0, 1, and 2, respectively, in accordance with an embodiment of the present disclosure.

If adjacent nodes are placed in dissimilar clusters, the interaction energy is −0.5 and 1 for similar clusters. This contrasts with the desirable energy values of −1 and 1 for dissimilar and similar clusters, respectively. But this does not have any effect on the clustering result since the energy for adjacent vertices in different clusters is still lower than that for similar clusters, and the former is energetically favored. To provide an easy visualization, the cluster classes can be modelled along the cube roots of unity as shown in FIG. 5. FIG. 5, with reference to FIGS. 1 through 4, depicts cluster classes being modelled along vectors, 0, 1, and 2, respectively, in accordance with an embodiment of the present disclosure. The requirement for such a visualization becomes evident as described herein.

Figure 6:
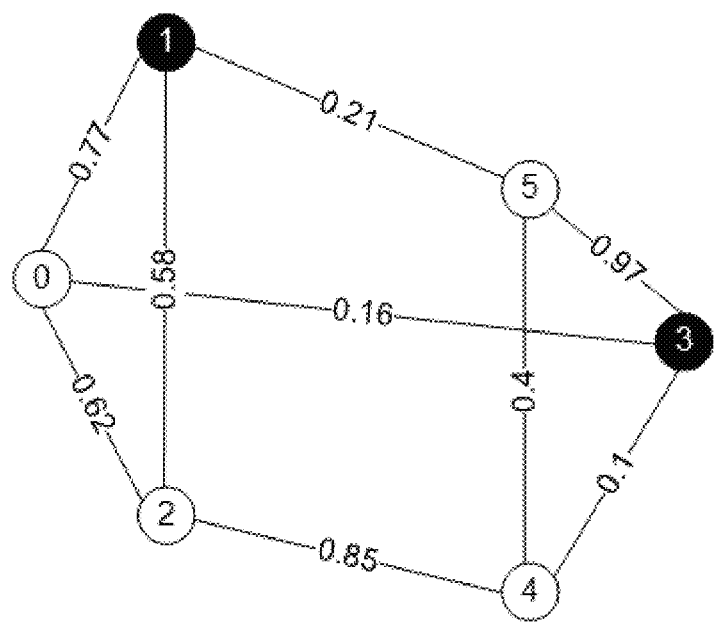
FIG. 6 depicts results of max 3-cut clustering into three clusters, in accordance with an embodiment of the present disclosure.

The typical result of max 3-cut partitioning on a graph can be seen in FIG. 6. FIG. 6, with reference to FIGS. 1 through 5, depicts results of max 3-cut clustering into three clusters, in accordance with an embodiment of the present disclosure. The final Hamiltonian for max-cut is given by:

$$H = \Sigma_{ij} \frac{w_{ij}}{2} (\Omega_3^i \Omega_3^{j\dagger} + \Omega_3^{i\dagger} \Omega_3^j) \quad (16)$$

Extensive simulation studies with different graphs corroborates the applicability of the proposal.

Referring to the steps of the method of the present disclosure of FIG. 3, the steps of FIG. 3 will now be explained with reference to components of the system 100 of FIG. 2, and the flow diagram as depicted in FIG. 3. In an embodiment, at step 202 of the present disclosure, the one or more hardware processors 104, receive an input graph comprising a plurality of nodes and a plurality of edges, wherein the input graph comprises a d-ary problem to be solved. The nodes and edges are depicted by way of examples in previous figures (e.g., refer to FIGS. 1 and 4). The input graph could be derived from a dataset. The dataset comprises of one or more values (e.g., say sensor values), in one example embodiment. Alternatively, the input graph can be passed as the adjacency matrix of the graph, or some other data-structure that captures all the information in the graph.

In an embodiment, at step 204 of the present disclosure, the one or more hardware processors 104 map the d-ary problem to an Ising Model to obtain a d-ary Quantum Ising Hamiltonian. In an embodiment, the d-ary Quantum Ising Hamiltonian is indicative of a cost function. The above steps of 202 and 204 are better understood by way of following description.

Having looked at max-cut and max 3-cut, where the nodes of a graph are partitioned into two or three classes respectively, embodiments of the present disclosure provide system and method that implement a generalized way of the max-cut problem for d classes. Such problems have traditionally been known as max d-cut. Before moving onto the problem, it is necessary to introduce some additional mathematical machinery to facilitate the solution.

As mentioned above, the matrix $\Omega_3$ can be recognized as the clock matrix for three dimensions. This is not surprising as the clock and shift matrices, $U_d$ and $V_d$ have been used to generalize the Pauli-Z and X matrices, respectively, for d and d-ary optimization problems, where the variables can take d number of discrete values, similar to a d-level system. Here, the idea of Quadratic Unconstrained Binary Optimization (QUBO) is extended to such d-ary problems and the techique is dubbed as QUDO. To construct the Hamiltonian for the max d-cut problems, the d-dimensional clock matrices (specified in equations (17) and (18)) are used to appropriately replace the Pauli-Z matrix in equation (7), as was done for max 3-cut in equation (16).

$$V_d = \Sigma_{j=0}^{d-1} |j\rangle \langle (j+1) \bmod d| \quad (17)$$

$$U_d = \Sigma_{j=0}^{d-1} \omega^j |j\rangle \langle j| \quad (18)$$

where $\omega = e^{2\pi i/d}$ is the $d^{th}$ root of unity.

The resultant Ising Hamiltonians for max d-cut is specified as:

$$H = \sum_{ij} \frac{w_{ij}}{2} (U_d^i U_d^{j\dagger} + U_d^{i\dagger} U_d^j) \quad (19)$$

Further, it is possible to view the method of the present disclosure as a quantum mechanical extension of the vector Potts model, where the spin states of a d level system are equally spaced on a unit circle, with the interaction energy of adjacent spins depending on the cosine of the relative angles between the states. When the Ising model contains external, longitudinal magnetic field terms, equations (7) and (19) modify to equations (21) and (22), respectively, where $h_i$ can be considered as an additional weight of the ith node of the graph under consideration. This is carried out by leveraging equation (20).

$$\sigma_Z = \frac{1}{2}(\sigma_Z + \sigma_Z^\dagger) \quad (20)$$

$$H(\sigma) = \sum_{ij} w_{ij} \sigma_z^i \sigma_z^j + \sum_i h_i \sigma_z^i \quad (21)$$

$$H = \sum_{ij} \frac{w_{ij}}{2} (U_d^i U_d^{j\dagger} + U_d^{i\dagger} U_d^j) + \sum_i \frac{h_i}{2} (U_d^i + U_d^{i\dagger}) \quad (22)$$

The d-ary Quantum Ising Hamiltonian is obtained by replacing Pauli X and Z matrices comprised in a binary Quantum Ising Hamiltonian (e.g., refer to equations (21) and (22)) by d-dimensional shift and clock matrices, respectively (e.g., refer to equation (17) for d-dimensional shift matrices and equation (18) for clock matrices) and corresponding tensor products (e.g., refer to equation (8) for tensor products). The Pauli X and Z matrices correspond to ith node of the input graph, in one embodiment of the present disclosure.

In an embodiment, at step 206 of the present disclosure, the one or more hardware processors 104 execute, the d-ary Quantum Ising Hamiltonian indicative of the cost function, on one or more qudit processors, to obtain one or more resultant quantum states. The one or more resultant quantum states correspond to the identified d-ary problem. At step 208, the one or more hardware processors 104 measure the one or more resultant quantum states in a qudit computational basis to obtain at least one solution. The at least one solution is obtained for the cost function.

Figure 7:
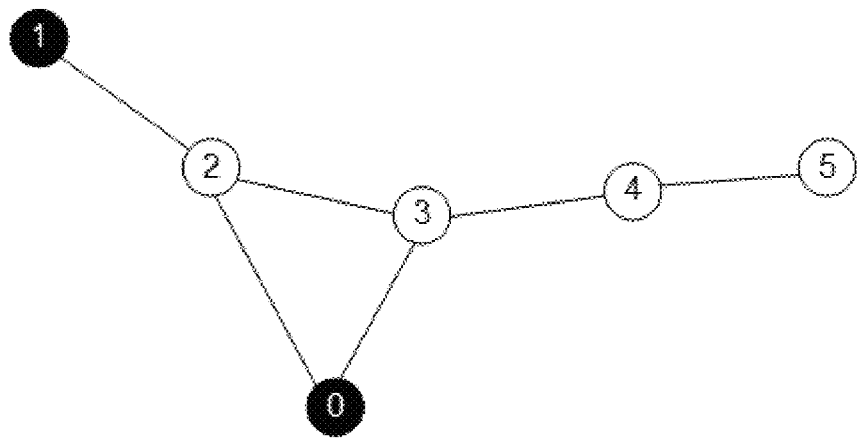
FIG. 7 depicts results of max 4-cut clustering on an unweighted graph into four clusters, in accordance with an embodiment of the present disclosure.

A result of quaternary clustering for a simple graph is shown in FIG. 7. More specifically, FIG. 7, with reference to FIGS. 1 through 6, depicts results of max 4-cut clustering on an unweighted graph into four clusters, in accordance with an embodiment of the present disclosure. The clusters are depicts depicted in circles with various shades (including color coding/color pattern)/pattern filings. For instance, nodes 1 and 0 form a cluster, node 2 forms another cluster, node 4 forms yet another cluster, and nodes 3 and 5 form yet further cluster. Again, extensive verification of the results of the formulation using different graphs and weights has been carried out.

For the d=4 case, the interaction Hamiltonian matrix for two adjacent notes has been shown in the below matrix.

$$\begin{array}{c} & |00\rangle\ |01\rangle\ |02\rangle\ |03\rangle\ |10\rangle\ |11\rangle\ |12\rangle\ |13\rangle\ |20\rangle\ |21\rangle\ |22\rangle\ |23\rangle\ |30\rangle\ |31\rangle\ |32\rangle\ |33\rangle \\ \begin{array}{c}|00\rangle\\|01\rangle\\|02\rangle\\|03\rangle\\|10\rangle\\|11\rangle\\|12\rangle\\|13\rangle\\|20\rangle\\|21\rangle\\|22\rangle\\|23\rangle\\|30\rangle\\|31\rangle\\|32\rangle\\|33\rangle\end{array} \begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & -1 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & -1 & 0 & 0 & 0 & 0 & 0 & 0 & 0 & 0 \\ 0 & 0 & 0 & 0 & 0 & 0 & 0 & 0 & -1 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & -1 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 1 \end{bmatrix}\end{array}$$

It should be noted that $|aa\rangle$ elements are 1, while the $|ab\rangle$ elements are 0 or −1. This happens because there are two possible angles between the $4^{th}$ roots of unity, i.e., $\pi/2$ or $\pi$. If the angle between the classes is $\pi/2$, then the interaction term is 0, and it is −1 if the classes are $\pi$ radians apart. This means that having a larger angular difference between the classes is more favorable. The effect of clustering still remains the same, however. The system settles for a state that ensures the highest angular difference between the classes. This was not apparent for the d=2 or d=3 cases because there was only one possible angle between the classes.

Figure 8:
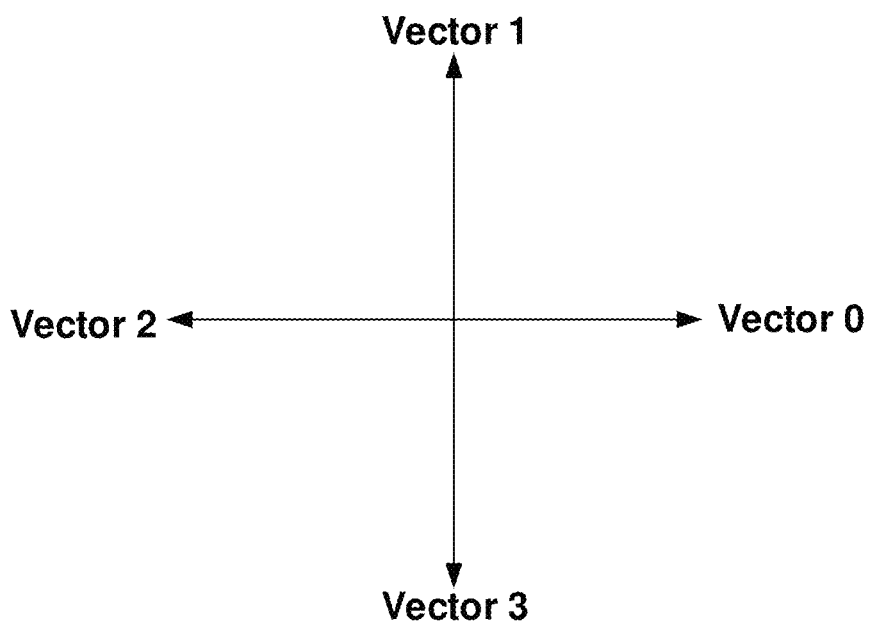
FIG. 8 depicts cluster classes along the vectors 0, 1, 2 and 3, respectively, in accordance with an embodiment of the present disclosure.
Figure 9:
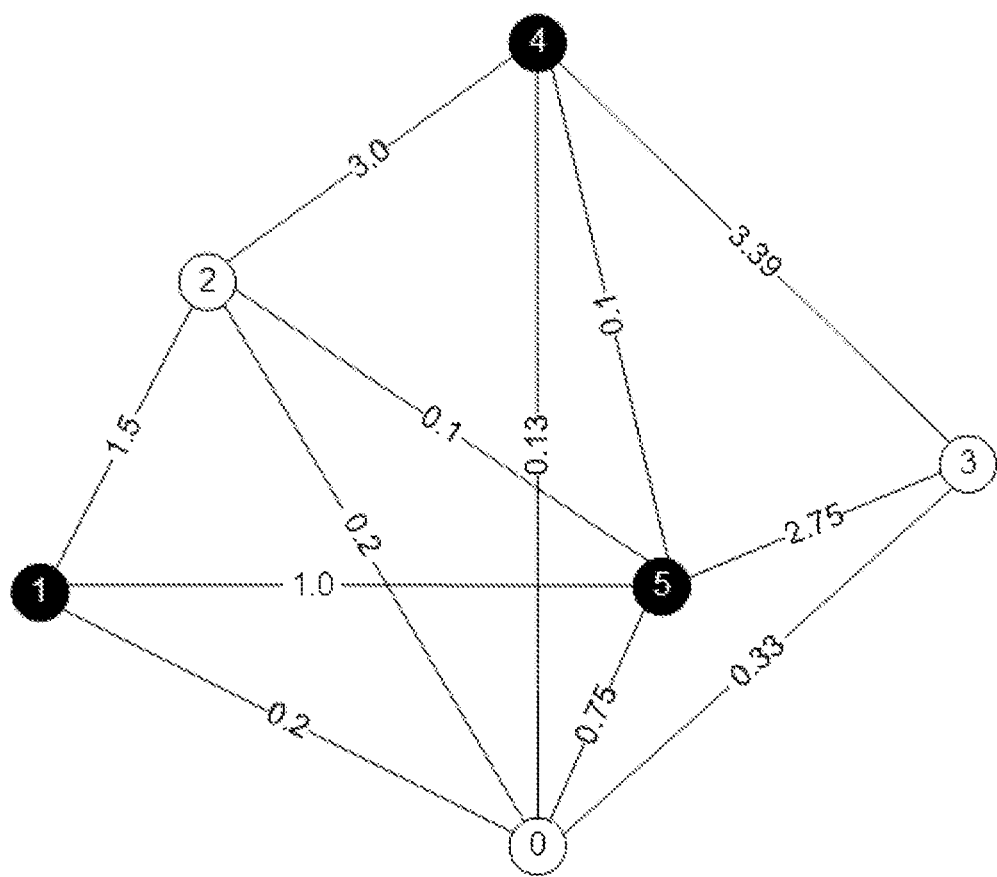
FIG. 9 depicts results of max 4-cut clustering where the nodes get placed into only two clusters, instead of four, in accordance with an embodiment of the present disclosure.

For a d-cluster problem, if the classes are numbered from 0 to (d-1), then the interaction energy term between nodes of classes a and b is given by:

$$z_a \cdot z_b = \tfrac{1}{2}(\bar{z}_a z_b + z_a \bar{z}_b) \tag{23}$$

where $z_a = e^{2\pi a i/d}$ and $\bar{z}_a$ is the complex-conjugate of $z_a$. FIG. 8 shows vector representation of the four classes along the fourth roots of unity. More specifically, FIG. 8, with reference to FIGS. 1 through 7, depicts cluster classes along the vectors 0, 1, 2 and 3, respectively, in accordance with an embodiment of the present disclosure.

Additionally, for d=4, an interesting behavior was observed. For many graphs, the result was bipartite, i.e., the resultant partition had only two classes. The partitioning for such a graph has been shown in FIG. 9. More specifically, FIG. 9, with reference to FIGS. 1 through 8, depicts results of max 4-cut clustering where the nodes get placed into only two clusters, instead of four, in accordance with an embodiment of the present disclosure. Other graphs had solution states for 2, 3 and 4 classes, all having the minimum energy eigenvalue. This might have been due to the fact that adjacent classes have 0 interaction energy. Further investigations are necessary for more than 4 classes and to arrive at the nature of the behavior for general d classes.

With the NISQ devices already being available, it is really essential to consider the implementation of the quantum algorithms on the hardware. The binary max-cut problem can be solved using quantum annealing such that the system settles to the final Hamiltonian given by the Ising function. The D-Wave™ annealer Hamiltonian may be represented as:

$$H_{ising} = -\frac{A(s)}{2}\left(\sum \sigma_x^i\right) + \frac{B(s)}{2}\left(\sum_i h_i \sigma_z^i + \sum_{i>j} J_{ij}\sigma_z^i \sigma_z^j\right) \tag{24}$$

The cost function can easily be mapped to the D-Wave™ Ising Hamiltonian and the minimum energy states can be obtained by appropriate sampling.

Alternatively, the QAOA approach can also be utilized to find the solution of the binary max-cut problem by evolving the appropriately prepared wavefunction using unitary operators towards the Hamiltonian obtained by casting the problem into the Ising model (or the equivalent QUBO). Thus, QA and QAOA have a formulation of the Ising model in common but they require different hardware. Conventional research work has compared the two approaches for a different, but similar, problems. In QAOA hybrid quantum and classical processing is utilized and the quantum computation is in terms of the gate-circuit model.

For max d-cut (or QUDO) problems, these approaches cannot be used directly. The existing quantum annealers are inherently binary in nature, due to the presence of 2×2 Pauli matrices. Conventional research work has proposed a concept of super nodes for Graph Partitioning into d classes. The problem formulation is quite similar to that of max-cut, and the same approach can be used for the latter. The drawback is that for a graph with N vertices, dN qubits are required to model the problem onto an annealer and the matrix blows up by a factor of $d^2$.

If useful, future annealers can be designed in such a way that they utilise equation (19) as the final Hamiltonian, with the addition of cross terms containing $U_d$ and $V_d$. Specifically, annealers can be thought of based on qutrits to address the max 3-cut based on equation (16).

Qudit-Based Circuit of QAOA for Max d-Cut:

The present disclosure elaborates the steps to construct the gate-based quantum circuit for solving the problem of Max d-Cut using QAOA, which utilizes a hybrid approach by leveraging the variational principle, for the d-ary case. In QAOA a p-layer ansatz $|\Psi(\gamma, \beta)\rangle$, with the cost and mixing Hamiltonians $H_c$ and $H_x$ are used, where:

$$|\Psi(\gamma,\beta)\rangle = e^{-i\beta_p H_x} e^{-i\gamma_m H_c} \ldots e^{-i\beta_1 H_x} e^{-i\gamma_1 H_c} |+\rangle^{\otimes n} \tag{25}$$

The parameters $\gamma$ and $\beta$ are found using classical optimizers, subject to the minimization of $\langle\Psi(\gamma,\beta)|H_c|\Psi(\gamma,\beta)\rangle$. The modifications required to use QAOA on qudit-based systems to solve the max d-cut problem is described below.

In other words, when the one or more qudit processors are identified as the one or more gate model qudit processors, the steps of executing, the d-ary Quantum Ising Hamiltonian indicative of the cost function (e.g., refer to step 206), and measuring the one or more resultant quantum states (e.g., refer to step 208) comprises placing, one or more qudits in the one or more gate model qudit processors in an equal, zero-phase superposition from an initial zero state using a generalized Walsh-Hadamard matrix. The above step of placing, one or more qudits in the one or more gate model qudit processors in an equal, zero-phase superposition from an initial zero state using a generalized Walsh-Hadamard matrix can be better understood by way of following description.

1. Preparation of the state $|+\rangle_d^{\otimes n}$: It is widely known that $|+\rangle_d^{\otimes n}$ is used to refer to the zero-phase, equal-superposition of the system, and is achievable by the application of the H gate on all the qubits which are initially in the $|0\rangle$ state, i.e.:

$$|+\rangle^{\otimes n} = H^{\otimes n}|0\rangle^{\otimes n} \quad (26)$$

To obtain a similar superposition for qudits, the use of the generalized Walsh-Hadamard matrix $W_d$ is proposed by the method and system of the present disclosure, in a d-dimensional Hilbert space, where $\omega^{2\pi i/d}$. To distinguish qudits from the traditionally used qubits, the qudit states are represented as $|x\rangle_d$.

$$W_d = \frac{1}{\sqrt{d}} \begin{bmatrix} 1 & 1 & 1 & \ldots & 1 \\ 1 & \omega^{d-1} & \omega^{2(d-1)} & \ldots & \omega^{(d-1)^2} \\ 1 & \omega^{d-2} & \omega^{2(d-2)} & \ldots & \omega^{(d-1)(d-2)} \\ \vdots & \vdots & \vdots & \ddots & \vdots \\ 1 & \omega & \omega^2 & \ldots & \omega^{d-1} \end{bmatrix} \quad (27)$$

$$|+\rangle_d^{\otimes n} = W_d^{\otimes n}|0\rangle_d^{\otimes n} \quad (28)$$

Figure 10:
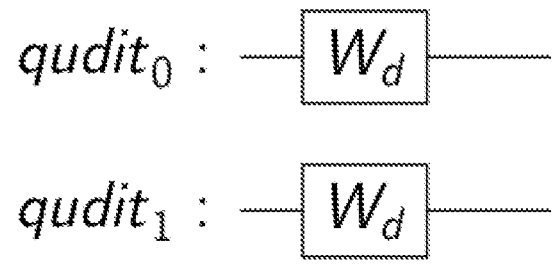
FIG. 10 depicts a circuit to place qudits in equal, zero-phase superposition from $|0\rangle_d$, in accordance with an embodiment of the present disclosure.
Figure 11:
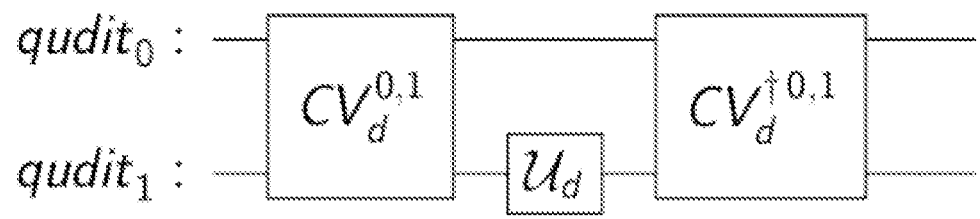
FIG. 11 depicts a circuit to apply an $e^{-i\gamma_m H_c}$ operator on qudits 0 and 1 for an edge between the corresponding nodes, in accordance with an embodiment of the present disclosure.

FIG. 10 shows a circuit to obtain the state $|+\rangle_d$ from $|0\rangle_d$. More specifically, FIG. 10, with reference to FIGS. 1 through 9, depicts a circuit to place qudits in equal, zero-phase superposition from $|0\rangle_d$, in accordance with an embodiment of the present disclosure.

Once the one or more qudits are placed in the one or more gate model qudit processors, the one or more qudits are operated by applying a phase oracle in a d-ary Quantum Approximate Optimization Algorithm (QAOA) to obtain an intermediate superposition state of the one or more qudits. The above step of operating the one or more qudits by applying the phase oracle can be better understood byway of the following description.

2. Construction of $e^{-i\gamma_m H_C}$: For the given max d-cut unitary to be implemented using qudit-circuits, it is imperative to define the following new unitary gates:

a. A two-qudit controlled-$V_d$ gate that applies the $V_d^k$ gate on the target-qudit when the control-qudit is in the state $|k\rangle_d$. This gate is analogous to the traditional CX gate in the qubit case. The matrix-form of the gate, with the ith qudit as control, and jth qudit as the target, it given by $CV_d^{(ij)} = \text{diag}(I, V_d, V_d^2, \ldots, V_d^{d-1})$, where $V_d = \Sigma_{l=0}^{d-1}|l\rangle\langle l+1| \mod d|$ and $V_d^k = \Sigma_{l=0}^{d-1}|l\rangle\langle l+k| \mod d|$, which extends from equation (17).

The other gate $\mathcal{U}_d$ takes d parameters and is the qudit counterpart of the $R_z$ gate; $R_z(\theta)$ is a single-qubit rotation through angle $\theta$ (radians) around the z-axis. If the parameters are given by $\Phi = \{\phi_0, \phi_1, \ldots, \phi_{d-1}\}$, then $\mathcal{U}_d = \text{diag}(e^{i\phi_0}, e^{i\phi_1}, \ldots, e^{i\phi_{d-1}})$. It may immediately be observed that, $\mathcal{U}_d = U_d$, then $$\Phi = \left\{0, \frac{2\pi}{d}, \frac{3\pi}{d}, \ldots, \frac{2(d-1)\pi}{d}\right\}.$$

In the d-ary case for max-cut, as discussed above, each node in the graph is represented by a qudit in the quantum circuit. To solve the max d-cut using QAOA, the Ising Hamiltonian derived in equation (4) functions as $H_c$, from which the evolution operator $e^{-i\gamma_m H_c}$ is constructed as shown in equation (29). The corresponding circuit for a single edge between the nodes 0 and 1 of a graph has also been portrayed in FIG. 11 with parameter $\gamma_m$ for the mth layer of QAOA. More specifically, FIG. 11, with reference to FIGS. 1 through 10, depicts a circuit to apply the $e^{-i\gamma_m H_c}$ operator on qudits 0 and 1 for an edge between the corresponding nodes, in accordance with an embodiment of the present disclosure. The argument can be extended to form the cost evolution operator for every edge in the graph and each layer.

$$e^{-i\gamma_m H_C} = e^{i\gamma_m \Sigma_{ij} \frac{w_{ij}}{2}\left(U_d^i U_d^{j\dagger} + U_d^{i\dagger} U_d^j\right)} = \prod_{ij} CV_d^{(ij)} \cdot I \otimes \mathcal{U}_{d\Phi} \cdot CV_d^{\dagger(ij)} \quad (29)$$

where $\Phi = \{-\gamma_m w_{ij}, -\gamma_m w_{ij} \cos(2\pi/d), \ldots, -\gamma_m w_{ij} \cos(2(d-1)\pi/d)\}$. The equation (29) herein corresponds to the phase oracle being applied.

Once the one or more qudits are operated by applying the phase oracle in the d-ary Quantum Approximate Optimization Algorithm (QAOA) and an intermediate superposition state of the one or more qudits are obtained, a d-ary diffusion operator comprising the d-ary Quantum Approximate Optimization Algorithm (QAOA) is applied on the one or more qudits, to obtain a resultant output. The step of applying a d-ary diffusion operator on the one or more qudits is better understood by way of the following description.

3. Construction of Mixing Operator, $e^{-i\beta_m H_x}$: QAOA, being a trotterized, adiabatic annealing procedure, relies on the use of a mixing or driver Hamiltonian $H_x$. Traditionally, the single-qubit version of Grover's Diffusion Operator has been used as the mixing operator. This is evident from the fact that $e^{i\beta X/2} = R_x(-\beta) = H((1-e^{i\beta})|0\rangle\langle 0|-I)H$, upto up to a global phase factor, where $R_x(\theta)$ signifies a rotation of the state about the x-axis by an angle of $\theta$ radians. With advancements of the algorithm, better mixing Hamiltonians—which are more suited to the problem. However, in this implementation, the single qudit version of the diffusion operator is considered as below:

$$e^{-i\beta_m H_x} = \Pi_t W_d \cdot \mathcal{U}_{d(-2\beta_m, 0, \ldots, 0)} \cdot W_d^\dagger \quad (30)$$

The above equation (30) corresponds to the diffusion operator that is applied on the one or more qudits, in one embodiment.

Figure 12:
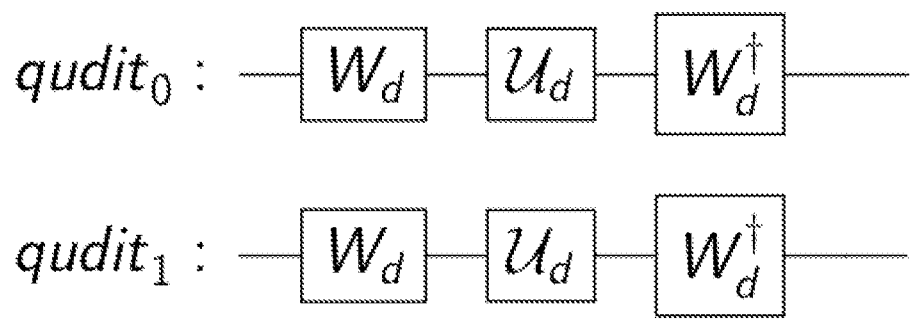
FIG. 12 depicts a circuit to implement an $e^{-i\beta_m H_x}$ operator, in accordance with an embodiment of the present disclosure.

The circuit in FIG. 12 shows the procedure to apply the mixing operator in the mth layer to two of the qudits with parameter $\beta_m$. More specifically, FIG. 12, with reference to FIGS. 1 through 11, depicts a circuit to implement the $e^{-i\beta_m H_x}$ operator, in accordance with an embodiment of the present disclosure. Again, the same circuit with corresponding parameters can be used for each of the p layers in QAOA. As mentioned above, the numerical evaluation of the results based on the suggested formulation did bring out the usefulness of the approach. Once the resultant output is obtained, the steps of (i) operating the one or more qudits by applying a phase oracle in a d-ary Quantum Approximate Optimization Algorithm (QAOA) to obtain an intermediate superposition state of the one or more qudits and (ii)

applying, on the one or more qudits, a d-ary diffusion operator in the d-ary Quantum Approximate Optimization Algorithm (QAOA) to obtain a resultant output, are repeated based on a pre-defined number of iterations to obtain one or more resultant quantum states. The one or more resultant quantum states are measured in the qudit computational basis to obtain at least one solution for the cost function.

The above method and system of the present disclosure can be better understood by way of following example: Consider 3 nodes that are connected using 2 edges. For instance, a first node is connected to a second node using a first edge and the second node and a third node are connected using a second edge.

| Configuration | Energy |
|---|---|
| 000 | 3 |
| 001 | −1 |
| 010 | −3 |
| 011 | 1 |
| 100 | 1 |
| 101 | −3 |
| 110 | −1 |
| 111 | 3 |

The input to the algorithm is in the form of the graph structure depicting the connection between the nodes and the edge(s) as described above, which can be passed as the adjacency matrix of the graph, or some other data-structure that captures all the information in the graph. The graph has a d-ary problem to be solved which is mapped to the Ising model using the equation (7) $H(\sigma)=\Sigma_{ij}w_{ij}\sigma_z^i\sigma_z^j$, as described above. Based on the equation (4) and the mapping of the d-ary problem to the Ising model, $\sigma$ is the overall configuration of the system (e.g., such 000, 001, etc.), $\sigma_i$ are the Pauli-Z matrices representing the ith node of the graph, and $w_{ij}$ is the weight of the edge between the ith and jth nodes. $\sigma_i\sigma_j$ is the appropriate tensor product of the Pauli-Z and identity matrices. Since this document deals with explaining the 2-cluster case, the step that replaces the Pauli-Z matrix may not be required. The above equation can be expanded as:

$$H(\sigma)=w_{0,1}(\sigma\otimes\sigma\otimes I)+w_{1,2}(I\otimes\sigma\otimes\sigma)$$

If there were an edge between the nodes 0 and 2, then the expression corresponding to it would have been: $w_{0,2}(\sigma\otimes I\otimes\sigma)$. The same can be expressed in the matrix (Ising Hamiltonian matrix) form as below:

$$H(\sigma) = 1\left(\begin{bmatrix}1 & 0\\0 & -1\end{bmatrix}\otimes\begin{bmatrix}1 & 0\\0 & -1\end{bmatrix}\otimes\begin{bmatrix}1 & 0\\0 & 1\end{bmatrix}\right)+2\left(\begin{bmatrix}1 & 0\\0 & 1\end{bmatrix}\otimes\begin{bmatrix}1 & 0\\0 & -1\end{bmatrix}\otimes\begin{bmatrix}1 & 0\\0 & -1\end{bmatrix}\right)$$

$$H(\sigma) = 1\begin{bmatrix}1 & 0 & 0 & 0 & 0 & 0 & 0 & 0\\0 & 1 & 0 & 0 & 0 & 0 & 0 & 0\\0 & 0 & -1 & 0 & 0 & 0 & 0 & 0\\0 & 0 & 0 & -1 & 0 & 0 & 0 & 0\\0 & 0 & 0 & 0 & -1 & 0 & 0 & 0\\0 & 0 & 0 & 0 & 0 & -1 & 0 & 0\\0 & 0 & 0 & 0 & 0 & 0 & 1 & 0\\0 & 0 & 0 & 0 & 0 & 0 & 0 & 1\end{bmatrix}+$$

$$2\begin{bmatrix}1 & 0 & 0 & 0 & 0 & 0 & 0 & 0\\0 & -1 & 0 & 0 & 0 & 0 & 0 & 0\\0 & 0 & -1 & 0 & 0 & 0 & 0 & 0\\0 & 0 & 0 & 1 & 0 & 0 & 0 & 0\\0 & 0 & 0 & 0 & 1 & 0 & 0 & 0\\0 & 0 & 0 & 0 & 0 & -1 & 0 & 0\\0 & 0 & 0 & 0 & 0 & 0 & -1 & 0\\0 & 0 & 0 & 0 & 0 & 0 & 0 & 1\end{bmatrix}$$

$$H(\sigma) = \begin{bmatrix}3 & 0 & 0 & 0 & 0 & 0 & 0 & 0\\0 & -1 & 0 & 0 & 0 & 0 & 0 & 0\\0 & 0 & -3 & 0 & 0 & 0 & 0 & 0\\0 & 0 & 0 & 1 & 0 & 0 & 0 & 0\\0 & 0 & 0 & 0 & 1 & 0 & 0 & 0\\0 & 0 & 0 & 0 & 0 & -3 & 0 & 0\\0 & 0 & 0 & 0 & 0 & 0 & -1 & 0\\0 & 0 & 0 & 0 & 0 & 0 & 0 & 3\end{bmatrix}$$

From the above matrix (the cost matrix or the Ising Hamiltonian matrix), it can be seen that all the energy values have been captured along the diagonal. The least eigenvalues are −3, and the eigenvectors corresponding to them are as below:

$$\begin{bmatrix}0\\0\\1\\0\\0\\0\\0\\0\end{bmatrix} \text{ and } \begin{bmatrix}0\\0\\0\\0\\0\\1\\0\\0\end{bmatrix}$$

These eigenvalues can be obtained through Quantum Annealing, or algorithms such as QAOA and VQE. On measurement, these eigenvectors yield the solution bit strings such as, but are is not limited to, 010 and 101, respectively, which correspond to the cost function. According to the solutions, the middle node (e.g., say the second) node is placed in a cluster, and the other two nodes (e.g., the first node and the third node) are placed in the other cluster. Conversely, the center node can be placed in B, and the leaf-nodes in cluster A.

The existing quantum processors are constructed of qubits, which are two-level systems and map the problems to the Ising Model (or the equivalent Quadratic unconstrained binary optimization (QUBO) formulation), which use 2×2 Pauli matrices to construct the Hamiltonian corresponding to a problem. Hence, each qubit can be used to represent only a dichotomous variable. This inherently places the constraint of being directly applicable to only binary problems, as each qubit after measurement can be either state 0 or 1. To solve higher class problems, methods have been devised which use more resources to represent systems with higher number of levels.

By carefully examining the two cluster Max-Cut problem within the framework of the quantum Ising model, an extension has been worked out for max 3-cut with the identification of an appropriate Hamiltonian. Representative results, after carrying out extensive numerical evaluations, have been provided including a suggestion for possible futuristic implementation with qutrit devices. Further, extrapolation to more than 3 classes, which can be handled by qudits, of both annealer and gate-model varieties, has also been touched upon with some preliminary observations; quantum-assisted solving of Quadratic Unconstrained D-ary Optimization is arrived at within this context. As an additional novelty, a qudit-based gate-model circuit to solve max-d cut through Quantum Approximate Optimization (QAOA) algorithm is systematically constructed.

The method of the present disclosure includes creating the graph corresponding to a d-ary problem that needs to be solved. The input graph comprises a plurality of nodes and a plurality of edges. The d-ary problem is mapped to an Ising Model to obtain a d-ary Quantum Ising Hamiltonian, wherein the d-ary Ising Hamiltonian is obtained/constructed by appropriately replacing the Pauli X and Z matrices with the d-dimensional clock and shift matrices and taking their proper tensor products with the d-dimensional identity matrices. The ground (or excited, as required) states of the Hamiltonian can be found by utilising the annealing or gate-model qudit-based quantum processors, when they are available, and the measurements of the qudits in the computational basis should depict the requisite solutions. A possible way of utilizing the qudit-based quantum processors is to run the qudit version of Quantum Approximate Optimization Algorithm (QAOA), which has already been alluded to. To that end, the phase-oracle and diffusion operators have been created to characterize the requisite qudit quantum circuit.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. e.g., any kind of computer like a server or a personal computer, or the like, or any combination thereof. The device may also include means which could be e.g. hardware means like e.g. e.g., an application-specific integrated circuit (ASIC), a field-programmable gate array (FPGA), or a combination of hardware and software means, e.g. e.g., an ASIC and an FPGA, or at least one microprocessor and at least one memory with software processing components located therein. Thus, the means can include both hardware means, and software means. The method embodiments described herein could be implemented in hardware and software. Alternatively, the method of the present disclosure could be executed by a software (or a module). The device may also include software means. Alternatively, the embodiments may be implemented on different hardware devices, e.g. e.g., using a plurality of CPUs.

The embodiments herein can comprise hardware and software elements. The embodiments that are implemented in software includes but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for solving Quadratic Unconstrained D-ary Optimization (QUDO) problems, comprising:
   receiving, via one or more hardware processors, an input graph comprising a plurality of nodes and a plurality of edges, wherein the input graph comprises a d-ary problem to be solved;
   mapping, via the one or more hardware processors, the d-ary problem to an Ising Model to obtain a d-ary Quantum Ising Hamiltonian, wherein the d-ary Quantum Ising Hamiltonian is indicative of a cost function, wherein the d-ary Quantum Ising Hamiltonian is obtained by replacing Pauli X and Z matrices comprising a binary Quantum Ising Hamiltonian by d-dimensional shift and clock matrices respectively, and corresponding tensor products, and wherein the Pauli X and Z matrices correspond to an ith node of the input graph;
   executing, via the one or more hardware processors, the d-ary Quantum Ising Hamiltonian indicative of the cost function on one or more qudit processors to obtain one or more resultant quantum states, wherein the one or more resultant quantum states correspond to the identified d-ary problem; and measuring, via the one or more hardware processors, the one or more resultant quantum states in a qudit computational basis to obtain at least one solution.

2. The processor implemented method of claim 1, wherein the at least one solution is obtained for the cost function.

3. The processor implemented method of claim 1, wherein the one or more qudit processors comprise one or more annealing qudit processors or one or more gate model qudit processors.

4. The processor implemented method of claim 3, wherein when the one or more qudit processors are identified as the one or more gate model qudit processors, the steps of executing the d-ary Quantum Ising Hamiltonian indicative of the cost function and measuring the one or more resultant quantum states comprise:

placing one or more qudits in the one or more gate model qudit processors in an equal, zero-phase superposition from an initial zero state using a generalized Walsh-Hadamard matrix;

operating the one or more qudits by applying a phase oracle in a d-ary Quantum Approximate Optimization Algorithm (QAOA) to obtain an intermediate superposition state of the one or more qudits;

applying, on the one or more qudits, a d-ary diffusion operator in the d-ary Quantum Approximate Optimization Algorithm (QAOA) to obtain a resultant output;

repeating the steps of operating and applying based on a pre-defined number of iterations to obtain one or more resultant quantum states; and measuring the one or more resultant quantum states in the qudit computational basis to obtain at least one solution.

5. A system for solving Quadratic Unconstrained D-ary Optimization (QUDO) problems, comprising:
a memory storing instructions;
one or more communication interfaces; and
one or more hardware processors coupled to the memory via the one or more communication interfaces, wherein the one or more hardware processors are configured by the instructions to:

receive an input graph comprising a plurality of nodes and a plurality of edges, wherein the input graph comprises a d-ary problem to be solved;

map the d-ary problem to an Ising Model to obtain a d-ary Quantum Ising Hamiltonian, wherein the d-ary Quantum Ising Hamiltonian is indicative of a cost function, wherein the d-ary Quantum Ising Hamiltonian is obtained by replacing Pauli X and Z matrices comprising a binary Quantum Ising Hamiltonian by d-dimensional shift and clock matrices respectively, and corresponding tensor products, and wherein the Pauli X and Z matrices correspond to an ith node of the input graph;

execute the d-ary Quantum Ising Hamiltonian indicative of the cost function on one or more qudit processors to obtain one or more resultant quantum states, wherein the one or more resultant quantum states correspond to the identified d-ary problem; and measure the one or more resultant quantum states in a qudit computational basis to obtain at least one solution.

6. The system of claim 5, wherein the at least one solution is obtained for the cost function.

7. The system of claim 5, wherein the one or more qudit processors comprise one or more annealing qudit processors or one or more gate model qudit processors.

8. The system of claim 7, wherein when the one or more qudit processors are identified as the one or more gate model qudit processors, the one or more hardware processors are configured by the instructions to execute the d-ary Quantum Ising Hamiltonian indicative of the cost function and measure the one or more resultant quantum states by:

placing one or more qudits in the one or more gate model qudit processors in an equal, zero-phase superposition from an initial zero state using a generalized Walsh-Hadamard matrix;

operating the one or more qudits by applying a phase oracle in a d-ary Quantum Approximate Optimization Algorithm (QAOA) to obtain an intermediate superposition state of the one or more qudits;

applying, on the one or more qudits, a d-ary diffusion operator in the d-ary Quantum Approximate Optimization Algorithm (QAOA) to obtain a resultant output;

repeating the steps of operating and applying based on a pre-defined number of iterations to obtain one or more resultant quantum states; and measuring the one or more resultant quantum states in the qudit computational basis to obtain at least one solution.

9. One or more non-transitory machine-readable information storage media comprising one or more instructions which when executed by one or more hardware processors cause solving of Quadratic Unconstrained D-ary Optimization (QUDO) problems by:

receiving an input graph comprising a plurality of nodes and a plurality of edges, wherein the input graph comprises a d-ary problem to be solved;

mapping the d-ary problem to an Ising Model to obtain a d-ary Quantum Ising Hamiltonian, wherein the d-ary Quantum Ising Hamiltonian is indicative of a cost function, wherein the d-ary Quantum Ising Hamiltonian is obtained by replacing Pauli X and Z matrices comprising a binary Quantum Ising Hamiltonian by d-dimensional shift and clock matrices respectively, and corresponding tensor products, and wherein the Pauli X and Z matrices correspond to an ith node of the input graph;

executing the d-ary Quantum Ising Hamiltonian indicative of the cost function on one or more qudit processors to obtain one or more resultant quantum states, wherein the one or more resultant quantum states correspond to the identified d-ary problem; and measuring the one or more resultant quantum states in a qudit computational basis to obtain at least one solution.

10. The one or more non-transitory machine-readable information storage mediums of claim 9, wherein the at least one solution is obtained for the cost function.

11. The one or more non-transitory machine-readable information storage mediums of claim 9, wherein the one or more qudit processors comprise one or more annealing qudit processors or one or more gate model qudit processors.

12. The one or more non-transitory machine-readable information storage mediums of claim 11, wherein when the one or more qudit processors are identified as the one or more gate model qudit processors, the steps of executing the d-ary Quantum Ising Hamiltonian indicative of the cost function and measuring the one or more resultant quantum states comprise:

placing one or more qudits in the one or more gate model qudit processors in an equal, zero-phase superposition from an initial zero state using a generalized Walsh-Hadamard matrix;

operating the one or more qudits by applying a phase oracle in a d-ary Quantum Approximate Optimization Algorithm (QAOA) to obtain an intermediate superposition state of the one or more qudits;

applying, on the one or more qudits, a d-ary diffusion operator in the d-ary Quantum Approximate Optimization Algorithm (QAOA) to obtain a resultant output;

repeating the steps of operating and applying based on a pre-defined number of iterations to obtain one or more resultant quantum states; and measuring the one or more resultant quantum states in the qudit computational basis to obtain at least one solution.

* * * * *